United States Patent

[11] 3,583,816

[72] Inventor Yoshio Yuasa
       Sakai, Japan
[21] Appl. No. 785,680
[22] Filed Dec. 20, 1968
[45] Patented June 8, 1971
[73] Assignee Minoltacamera Kabushiki Kaisha
       Osaka, Japan
[32] Priority Dec. 28, 1967
[33] Japan
[31] 42/84824

[54] COLOR BALANCE AND EXPOSURE MEASURING SYSTEM FOR COLOR PRINTER
4 Claims, 10 Drawing Figs.
[52] U.S. Cl. .................................................. 356/178,
       356/186, 356/189, 356/222
[51] Int. Cl. ........................................................ G01j 3/48,
       G01j 3/46, G01j 1/42
[50] Field of Search............................................ 356/176-
       —178, 222—225, 186—189

[56] References Cited
UNITED STATES PATENTS

| | | | |
|---|---|---|---|
| 2,882,786 | 4/1959 | Kaye ........................... | 356/177 |
| 3,003,388 | 10/1961 | Hunter et al................... | 356/176 |
| 3,330,904 | 7/1967 | Gebel............................ | 356/177 UX |
| 3,409,378 | 11/1968 | Shimomura .................... | 356/222 |
| 3,428,403 | 2/1969 | Konishi ......................... | 356/222 |
| 3,449,053 | 6/1969 | Cannady et al................. | 356/178 |
| 3,476,132 | 11/1969 | Gebel............................ | 356/176 X |

Primary Examiner—Ronald L. Wibert
Assistant Examiner—Warren A. Sklar
Attorney—Mason, Fenwick and Lawrence ABSTRACT: A system for indicating the density and the combination of color compensating filters to be selected for the correction of color balance and for measuring the amount of exposure for color printing to be used in making positive images from the negative images comprises a plural number of detectors which are electrically connected in series and adapted to measure the light beam which has passed through color negatives.

PATENTED JUN 8 1971

Inventor

YOSHIO YUASA

By
Mason, Fenwick & Lawrence
Attorneys

Inventor
YOSHIO YUASA
By
Mason, Fenwick & Lawrence
Attorneys

COLOR BALANCE AND EXPOSURE MEASURING SYSTEM FOR COLOR PRINTER

The present invention relates to a color balance measuring system of color printer and to an exposure measuring system for the color printer and more particularly to a detecting system which is capable of effecting proper correction of the color balance required for making color prints from color negatives.

Generally, in order to make proper color prints from color negatives it is quite essential to known the color balance between the three primary colors of the negative in selecting the density and combination of the correcting filters in accordance with the negative image. For this purpose, various measuring methods have so far been proposed for the correction of the color balance in the color negative.

In general photographic pictures, it is the reproduction of halftone or highlight areas in the color positive that brings about a great effect upon the apparent color balance in the color positive, and this, when considered with respect to the negative, depends mainly on the dark area of the negative. Therefore, a color positive with proper color balance can be obtained by detecting the color balance in dark areas of a negative. However, general detectors for detecting the color balance are principally influenced by lighter areas of the negative, i.e. by the dark areas of the color positive since they are connected electrically in parallel in principle. In this case characteristic curves of the three layers of the printing paper and the film are exactly parallel to the corresponding exposure level and the indication for color compensation obtained with the detectors provides suitable color balance for the lighter areas as well as for the darker ones, whereas because the characteristic curves of the paper are not parallel with those of the color film, the color balance in the light areas of the color positive becomes consequently disturbed. Therefore, a color positive with suitable color balance cannot always be obtained by using the combination of color compensating filters which is indicated by the conventional measuring system. Particularly in case there is specific contrast in respective color regions of the negative the above-mentioned influence becomes more pronounced to result in overcorrection in an automatic color printer.

The primary object of the present invention is to provide a new and improved color balance and exposure measuring device which can achieve high probability of obtaining suitable color balance for various conditions of a color negative.

Accomplishment of the primary object of the invention is enabled by the employment of a measuring system in which the area of a measured plane on which light which has passed through the color negative falls corresponding to the negative is divided into a plurality of areas; three kinds of detectors which respectively have spectral sensitivity for red green and blue regions of light respectively face each divided area of the plane; the detectors of the same kind of spectral sensitivity are connected electrically in series with each other; and the color balance of the light which has passed through the color negative is obtained as a ratio of the three values detected with the three series connections of the detectors.

The amount of color compensation required for the color printing can be obtained by the measuring system by comparing the color balance of the light which has passed through the color negative with the standard value which is obtained through experimentation with the same measuring system and the difference between the two results is computed. This can be done in another way in which color compensating filters are inserted between the light source and the color negative; the color balance of the light which has passed through the negative is measured by said measuring system; and the combination and density of the color compensating filters are changed until the indication of the measurement shows the standard value, and thus suitable filters are selected.

Our statistical experimentation which will be discussed in detail hereinafter has proven that the values of color balance measured by the instant inventive measuring system produces suitable positives in a much higher percentage of cases than has been previously possible regardless of the condition of the color negatives. In other words, almost all of the color positives which are printed in accordance with the indication of said measuring system are acceptable as proper positives from the viewpoint of color balance.

Further in accordance with the present invention a proper exposure value is made available by the reading of one of series circuits connecting the R. G. B. detectors in respective R. G. B. groups.

Other advantages of the present invention will become apparent from the following description with reference to the accompanying drawings, in which.

Figure 1:
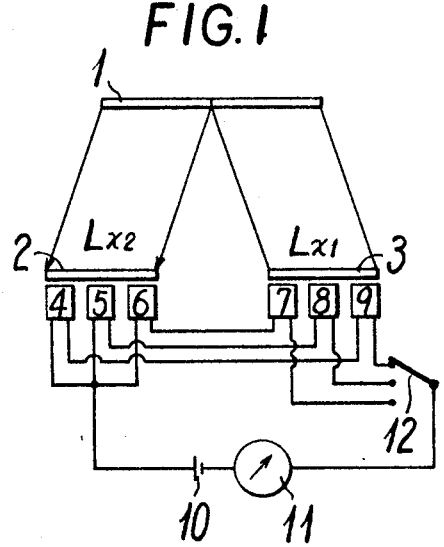
FIG. 1 is a diagram of the system of the present invention which illustrates the principle of the invention.
Figure 6:
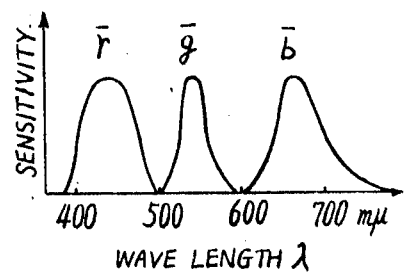
FIG. 6 is a diagram showing the spectrosensitivity of the detecting system.
Figure 7:
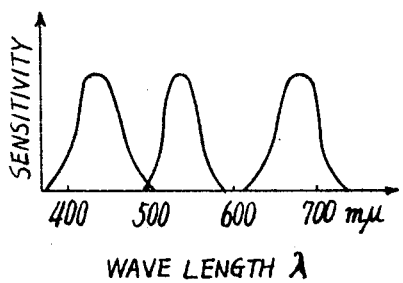
FIG. 7 is a diagram showing the spectrosensitivity of color printing paper.

In FIG. 1 schematically illustrating the fundamental structure of the present invention, numeral 1 designates a color negative; 2 and 3 diffusers; and 4 to 9, detectors having spectrosensitivity such as shown in FIG. 6. Detectors 4 and 9 are those having spectrosensitivity in the red region, detectors 5 and 8 are those having spectrosensitivity in the green region, and detectors 6 and 7 have spectrosensitivity in the blue region. The detectors are connected in series into respective color region groups and further connected through a R. G. B. changeover switch 12 to a power source 10 and to an ammeter 11. The detectors 4, 5 and 6 detect the light beam having intensity $Lx_2$ which has passed one of the divided areas of the color negative which has been divided in the suitable number, while the detectors 7, 8 and 9 are so arranged as to detect the light having intensity of $Lx_1$ which has passed another area of the above-mentioned negative.

Figure 2:
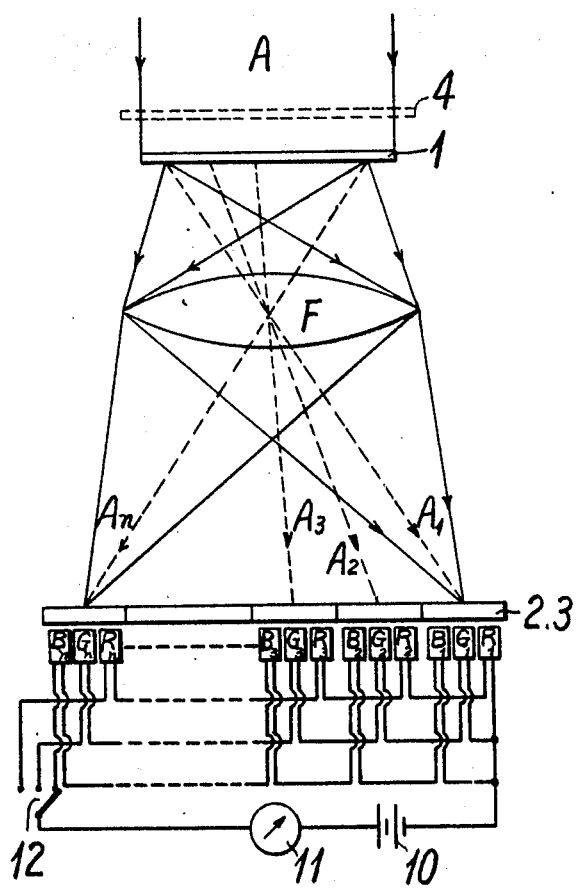
FIG. 2 is a schematic front view showing an embodiment of the present invention.
Figure 3:
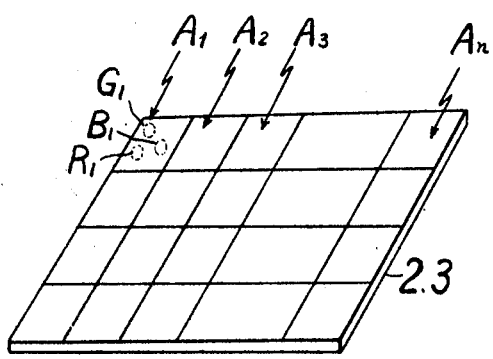
FIG. 3 is a perspective view showing part of the same.

While FIG. 1 shows an embodiment in which the color negative is divided into two areas, this may be embodied into a more common form of embodiment shown in FIG. 2. Light A from a light source (not shown), after passing through a film 1 bearing a negative image, passes through an image-forming lens F. Numerals 2 and 3 indicate a diffuser which is disposed in the plane where the negative image is formed by the lens F. Although the diffuser is actually divided two-dimensionally as illustrated in FIG. 3, they are shown as they are divided one-dimensionally for the convenience of explanation. A compensating filter 4 is placed in any position in the light beam as conventionally known. Provided behind the diffuser are three detectors each having spectrosensitivity characteristic $\bar{r}, \bar{g}$ and $\bar{b}$ respectively as shown in FIG. 6, three detectors being disposed for each divided area so as to detect the light on the whole part of each area. That is, in a divided area on which a light beam $A_1$ is incident are disposed detectors $R_1$, $G_1$ and $B_1$ respectively having $\bar{r}, \bar{g}$ and $\bar{b}$, in another area receiving beam $A_2$ are disposed $R_2$, $G_2$ and $B_2$, in another area receiving beam $A_3$ are disposed $R_3$, $G_3$ and $B_3$...in an area $A_n$ are provided $R_n$, $G_n$ and $B_n$. The detectors having the same spectrosensitivity are connected in series and each group of the connected detectors is selectively connected to an indicating instrument 11 and power source 10 through a changeover switch 12.

Figure 4:
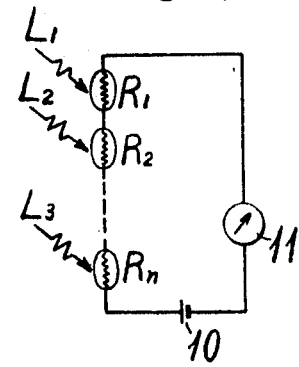
FIG. 4 is a diagram of the circuit showing the principle of the invention.

FIG. 4 illustrates the principle of the electrical connection system of one of R. G. B. groups of detectors, the detectors in each group having spectrosensitivity respectively on R.G.B. regions sown in FIG. 2. Suppose the detecting system in FIG. 4 is a system having spectrosensitivity on R region, $R_1$ in FIG. 4 corresponds to the detector $R_1$ in FIG. 2, $R_2$ in FIG. 4 to the detector $R_2$ in FIG. 2, and $R_n$ in FIG. 4 corresponds to the $n$th detector in FIG. 2. Each of the detectors $R_1$, $R_2$,....$R_n$ detects the light beam $L_1$, $L_2$....$L_n$ which has passed through each of the divided areas of the color negative.

Figure 5:
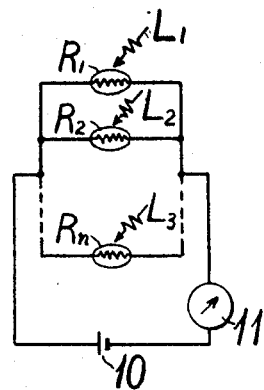
FIG. 5 is a diagram showing the principle of a parallel connection system as seen in a conventional detecting system.

On the other hand, the principle of parallel connection measuring system in a conventional detecting system is shown in FIG. 5.

With reference to FIG. 5 in which a detecting system of a conventional type is shown, a case in which Cds cells are employed as detectors will be described. Suppose the detectors $R_1$, $R_2$,...$R_n$ all have the same characteristics and are equivalent with respect to the characteristic of photoresistance to the intensity of incident light, i.e. so called $\gamma$, the relationship between $L_1$, $L_2$, $L_3$,...$L_n$, the intensity of the light incident on respective detectors and $r_1$, $r_2$, $r_3$,...$r_n$, the photoresistance of the respective detectors is $$r_1 = {}_1 1^\gamma$$
$$r_2 = {}_2 1^\gamma$$
$$r_3 = {}_3 1^\gamma \quad (1)$$
$$\vdots$$
$$r_n = {}_n 1^\gamma,$$

where $C$ is a constant. If the voltage of the power source is denoted by $E$, the total resistance $r$ an the current through the circuit including the indicating instrument 5 are $$(1/r) = (1/r_1) + (1/r_2) + (1/r_3) + (1/r_n)$$
$$= (1/C)(L_1^\gamma + L_2^\gamma + L_3^\gamma + ....+L_n^\gamma) \quad (2)$$
$$I = (E/r) = (E/C)(L_1^\gamma + L_2^\gamma + L_3^\gamma + ....+L_n^\gamma). \quad (3)$$

To simplify the explanation, suppose $\gamma=1$ and Eq. (3) is $$I = (E/C)(L_1 + L_2 + L_3 + ....+L_n). \quad (4)$$

Then a system in which detectors are thus connected is calibrated by applying standard light $Lo$. If the current passing through the instrument 5 when the light $m$ times as intense as the standard light is measured is denoted by $Ic$, we get $$Ic = (E/C)(mLo_1 + mLo_2 + mLo_3 + ....+_n)$$
$$= Km \cdot (E/C). \quad (5)$$

Hence
$$m = (1/K) \cdot (C/E) \cdot Ic, \quad (5)'$$

in which
$$K = Lo_1 + Lo_2 + Lo_3 + ....+Lo_n = \text{constant},$$

and $Lo_1$, $Lo_2$, $Lo_3$,....$Lo_n$ are the energy of the standard light incident on the respective areas in accordance with the standard light $Lo$. In a conventional method as by varying the distance between the light source and detector stepwise or by placing ND filters with different transmitting ratios before the light source, $m$ may be varied stepwise and the value of $Ic$ corresponding to respective values of $m$ may be measured to calibrate the system. Thus, a value $Ic'$ of the current for unknown light enables use to obtain $m'$ from Eq. (5), and accordingly the intensity of light $m'Lo$ will be known. The current $Ix$ which passes through the instrument when unknown energy of light $Lx_1$, $Lx_2$, $Lx_3$,....$Lx_n$ strikes respective detectors is $$Ix = (E/C)(Lx_1 + Lx_2 + Lx_3 + ....+Lx_n). \quad (6)$$

From Eqs. (5)' and (6), we get $$m_x = (1/K) \cdot (C/E) \cdot Ix$$
$$= (1/K)(Lx_1 + Lx_2 + Lx_3 + ....+_n). \quad (7)$$

Thus, a value which is proportional to the arithmetical means of the light energy $Lx_1$, $Lx_2$, $Lx_3$,...$Lx_n$ incident on respective detectors is given as the intensity of light $m_x$.

The detecting method of the present invention will be hereinafter described. Since the detectors are connected in series as shown in FIG. 4 in the present invention, the total resistance $r$ and the current $I$ passing through the instrument in case Cds cells are used as detectors as in FIG. 5 are $$r = C(L_1^{1\gamma} + L_2^{1\gamma} + L_3^{1\gamma} + ....+L_n^{1\gamma}). \quad (9)$$

(Note: Eq. (8) is omitted, being the same as Eq. (1).)

$$I = (E/C)(L_1^{1\gamma} + L_2^{1\gamma} + L_3^{1\gamma} + ....+L_n^{1\gamma})$$

Suppose $\gamma=1$, to simplify the explanation, we get $$I = (E/C)(L_1^{11} + L_2^{11} + L_3^{11} + ....+L_n^{11})^{11}. \quad (10)$$

When $m_1Lo$ is varied stepwise with respect to the standard light $Lo$ for calibration, the current $Ic$ for $m_1Lo$ is $$Ic = (E/C)(m_1Lo_1)^{11} + (m_1Lo_2)^{11} + ....+(m_1Lo_n)^{11}$$
$$= m_1(E/K_1C). \quad (11)$$

therefore
$$m_1 = (K_1C/E) \cdot Ic. \quad (11)'$$

Thus, $m_1$ is given from $Ic$ also in this case. If unknown light energy $Lx_1$, $Lx_2$, $Lx_3$,....$Lx_n$ falls on respective detectors with current $Lx$ passing through the instrument, we get $$Lx = (E/C)(Lx_1^{11}azLx_2^{11} + Lx_3^{11} + ...+Lx_n^{11}) \quad (12)$$

The light intensity obtained from Eqs. (11)' and (12) is $$m_1 = {}_l(Lx_1^{11} + Lx_2^{11} + Lx_3^{11} + ...+Lx_n^{11})^{11}.$$

Accordingly, a value proportional to the harmonic mean of the light energy $Lx_1$, $Lx_2$, $Lx_3$,...., $Lx_n$ incident on respective detectors can be read as light intensity $m_1$.

In case the color negative is divided into two areas as shown in FIG. 1 and subjected to detecting operation, Eqs. (7) and (13) will be $$m = \frac{1}{K}(Lx_1 + Lx_2)$$
$$K = Lo_1 + Lo_2 \quad (18)$$
$$m_1 = K_1 \frac{Lx_1 \cdot Lx_2}{Lx_1 + Lx_2}$$
$$K_1 = \frac{Lo_1 + Lo_2}{Lo_1 \cdot Lo_2} \quad (19)$$

Suppose the light energy for calibration is the same,
$$L = Lo_1 = Lo_2. \quad (20)$$

In case there is a difference between unknown light $Lx_1$ and $Lx_2$, we get $$nLx_1 = Lx_2 \quad (21)$$
$$Lx_1 = n'L \quad (22)$$

From Eqs. (20), (21), and (22), Eqs. (18) and (19) will be $$m = \frac{1}{2}(n+1) \quad (23)$$
$$m_1 = (2n/n1) \quad (24)$$

Figure 8:
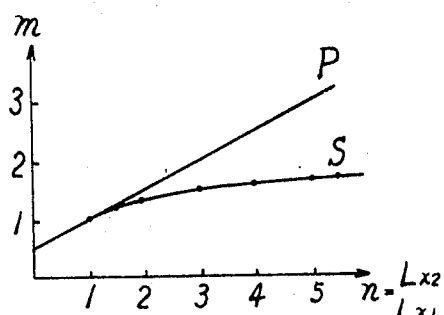
FIG. 8 is a diagram showing the relationship between the energy ratio of the light passing through the respective divided areas of the negative and the readings then indicated by the detecting system when there exist differences in density between the respective areas.

FIG. 8 shows Eqs. (23) and (24) as they are illustrated in a graph, the straight line P showing the effect of a conventional detecting system and the curveS, the effect of the detecting system in accordance with the present invention. It will be seen in the diagrams that when the contrast $n$ in the light energy between the two divided areas is large, the reading $m_1$ indicated by the present invention is smaller than the reading $m$ indicated by a conventional system even with respect to the same negative, and that the reading $m_1$ in accordance with the present invention is not influenced by the difference in the density of the divided areas.

As apparent from the description above, by dividing the color negative into more than one area for the measurement purpose and utilizing a detecting system comprising series circuits for connecting the detectors by respective groups having spectrosensitivity on R. G. B. regions, detecting operation can be performed to determine the apparent color balancing the color positive. The color balance is determined in accordance with the ratio of the readings of the R. G. B. detectors, which ratio is free from fluctuations due to the contrast of the R. G. B. regions in the negative. The convergence to effect the correction of the color balance can be carried out rapidly to obtain satisfactory color printing. Furthermore, since the ratio of the readings of the R. G. B. detectors can be secured free from fluctuations to obtain a color print with proper color balance, the exposure amount can be determined with any one of the readings of the R. G. B. detectors. By setting the diaphragm aperture of exposure time of a printer in which the exposure amount can be adjusted to the amount thus determined, the exposure amount based upon the light area of the positive can be determined in accordance with the above-mentioned characteristics.

Figure 9:
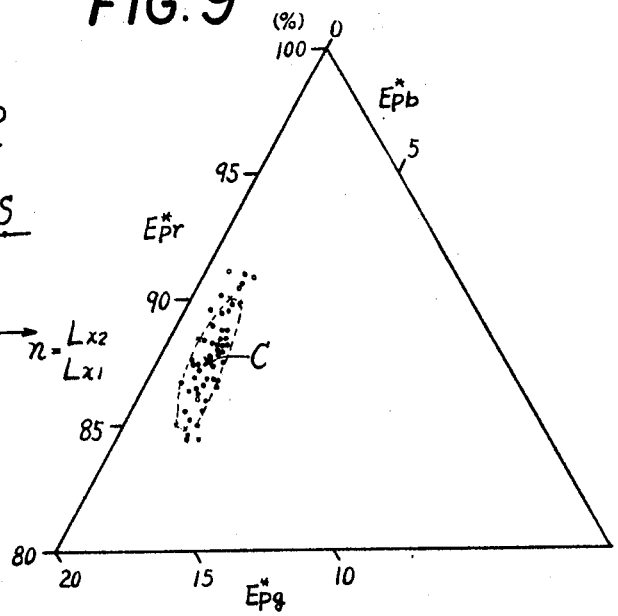
FIG. 9 is a diagram showing the distribution of the ratio of red, green and blue light contained in the printing light beam as measured by the present invention when proper printing is to be achieved.
Figure 10:
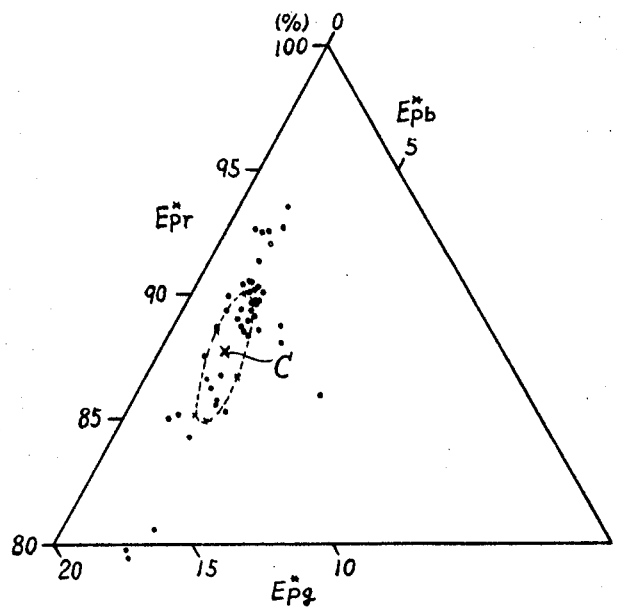
FIG. 10 is a diagram showing the distribution of the ratio of red, green and blue light contained in the printing light beam as measured by a conventional parallel connection system.

FIGS. 9 and 10 show statistical experimental findings about the distribution of the ratios of R. G. B. lights when printing was effected by the method of the present invention and the conventional one. The experiment was conducted as follows:

There were prepared many color negatives taken of scenes under various conditions, especially color conditions. From each negative, many prints were prepared, varying the density and combination of color compensating filters. The color balance value of the light which has passed through the negative under each of the above filter conditions was measured by the system of the present invention and the conventional one.

The color positives thus obtained were judged by several observers and the most proper positive was selected for each negative. The color balance values of these positives are plotted in triangular coordinates in FIGS. 9 and 10. In these figures, the coordinates axis (E$pr$) shows the percent of R (red); (E$pg$) that of G (green); and (E$pb$) that of B (blue). The percentages of R. G. B. lights represented by each dot can be read where a line drawn in parallel to each side of a triangle from the dot crosses the side of the triangle. These three percentages always make 100 percent.

"C" represents the average of the color balance values for the above positives measured by each system. The dotted circle represents one in which an allowance range of color balance for each dot can include the central value (C), in other words, satisfactory positives from the viewpoint of color balance can be obtained by adopting the central value (C) to the negatives for which the most suitable color balance values are given by the dots converged within the circle as shown in FIG. 9.

As is clear from FIGS. 9 and 10, most dots in FIG. 9 showing the present invention fall within the allowance range, and even the others are near that range. That is, the indications of the proper color balance are converged with little dispersion. In the conventional measuring system, however, as shown in FIG. 10, the dots are dispersed widely, few falling within the allowance range. Even if, therefore, the central value (C) is set at the standard one, there is little probability that the proper positive will be obtained.

As shown in FIG. 9, the variation of the ratio of R. G. B. light attributable to the kind of the negative when proper printing is to be effected is smaller in accordance with the present invention than in a conventional system shown in FIG. 10. When the value given statistically is set at C, over- or under-correction can be precluded, and when employed as a detecting system for an automatic color printer the present system can provide excellent color prints with a high probability. Being simple in structure, the present system can also readily be employed as a color balance measuring device for color printer and an exposure measuring device The detectors above are not limited to photoconductive cells such as Cds but combinations of spectrotransmitting filters and photoconductive cells may also be employed.

What I claim is:

1. A color balance measuring system for a color printer comprising a plurality of groups of photodetecting members, each of said groups comprising three photodetecting elements with each photodetecting element respectively having either red, green or blue spectrum region sensitivity, each of said groups being positioned on one side of a given region of a color negative to receive light from a light source on the other side of the negative passing through said region of the negative, each photodetecting member having the photoelectric characteristic that electric conductivity of the member increases in response to increase of spectral energy, output signal indicating means, and conductor means connecting only those photodetecting elements of the same spectral sensitivity in said groups in series to each other to said output signal indicating means which provides an output signal indicative of the color density for the red, green or blue respective regions of the spectrum so that comparison of each output for each spectrum region enables obtainment of optimum color balance.

2. A color balance measuring system as claimed in claim 1, wherein each of said photodetecting elements consists of an ordinary photoconductive cell and a spectrotransmitting filter having transmitting characteristics corresponding to the spectral sensitivity of the color printing material.

3. A color balance measuring system as claimed in claim 1, additionally including optical focusing means disposed between the color negative and said photodetecting members wherein each photodetecting member is disposed in a focal plane of the optical means which is conjugate with a plane of the color negative.

4. A color balance measuring system as claimed in claim 1, additionally including diffuser means and optical focusing means for forming an image of the color negative on said diffuser means wherein said groups of photodetecting members are disposed behind said diffuser so that each of said groups may receive light from each region of the diffuser.